United States Patent [19]

Eberle

[11] Patent Number: 5,001,024

[45] Date of Patent: Mar. 19, 1991

[54] STORAGE BATTERY AND METHOD OF MANUFACTURING

[76] Inventor: William J. Eberle, 2777 Irving Blvd., Dallas, Tex. 75207

[21] Appl. No.: 429,762

[22] Filed: Oct. 31, 1989

[51] Int. Cl.⁵ .......................... H01M 2/24; H01M 2/28
[52] U.S. Cl. .................................... 429/160; 429/161; 29/623.2
[58] Field of Search ............... 429/160, 161; 29/623.1, 29/623.2

[56] References Cited

U.S. PATENT DOCUMENTS

| 3,261,719 | 7/1966 | Shannon | 136/134 |
| 3,808,055 | 4/1974 | Eberle | 429/160 |
| 3,915,751 | 10/1975 | Sanekata et al. | 136/135 S |
| 4,509,253 | 4/1985 | Eberle | 29/623.1 |

Primary Examiner—Donald L. Walton
Attorney, Agent, or Firm—Timmons & Kelly

[57] ABSTRACT

Disclosed is a lead storage battery having a battery case divided into a plurality of cells. A stack of positive and negative battery plates is inserted into each cell and rests on a plurality of rest ups, which extend upward from the bottom of the case. A pair of clips are attached to the lower edge of each stack. A positive clip is attached to the positive plates and a negative clip is attached to the negative plates. When a stack is in a cell, the clips are located in receptacles, formed between the rest ups and the side walls of the case. The clips are in contact with contacts that extend through the partitions in the case, so that the positive clip on each stack is in electrical contact with the negative clip in the next cell. The receptacles are then filled with epoxy resin to anchor bond the clips into the receptacles and to insulate the clips and the contacts from the electrolyte acid.

18 Claims, 2 Drawing Sheets

STORAGE BATTERY AND METHOD OF MANUFACTURING

BACKGROUND OF THE INVENTION

1. Field of the Invention

This invention relates in general to storage batteries and to methods of manufacturing storage batteries. In particular, this invention relates to lead storage batteries of the type used in automobiles, and to methods of manufacturing such batteries.

2. Description of the Prior Art

A typical twelve-volt lead storage battery has a battery case divided into six cells. A stack of positive and negative battery plates is located in each cell. The positive plates are typically made of lead dioxide and the negative plates are typically metallic lead. The lead dioxide or metallic lead is usually coated onto a grid of metallic lead. The plates in a stack are separated by treated wood or glass fiber spacers.

Rest ups extend upward from the bottom of the case to support the stacks. The rest ups hold the plates off of the bottom of the case, so that any debris formed on the plates during operation of the battery will fall to the bottom of the battery case below the plates. This helps avoid shorting between the plates.

The battery case is filled with an electrolyte, such as a sulfuric acid solution. The battery plates are highly porous to provide maximum surface area for contact with the electrolyte. The electrolyte reacts with the battery plates to cause an electric charge to pass through the battery.

In order for the electric charge to pass from cell to cell, the positive plates in one cell must be electrically connected to the negative plates in the next cell. In many cases, these connections are made by welding lead connectors between the plates with a burning machine. Another method of connecting the plates is by casting a lead connector directly onto the stacks with a cast-on machine. Both of these methods involve a considerable amount of labor and machinery. The process can be made more economical by removing or reducing the amount of labor and machinery required.

U.S. Pat. No. 4,509,253, issued Apr. 9, 1985, to Eberle, discloses a storage battery and a method of making storage batteries in which the positive plates of one cell are electrically connected to the negative plates of an adjacent cell without the need for welding or casting. A conventional battery case is modified to provide openings through the partitions between the cells. Lugs on the positive plates in each cell are positioned downward and are aligned with lugs on the negative plates in the next cell. A conductive material is added to the bottoms of the cells and extends through the openings between cells to electrically connect the positive lugs in one cell to the negative lugs in the next cell. A sealing agent, such as epoxy resin, may be placed over the conductive material to hold the material in place and to protect the material from the electrolyte in the battery case.

The conductive material is a low temperature lead alloy, that includes bismuth and cadmium. When the batteries are recycled, the cadmium must be removed from the lead alloy. This involves a dangerous and expensive process.

SUMMARY OF THE INVENTION

The storage battery of the invention has a battery case, divided into a plurality of cells by a plurality of partitions. A stack of positive and negative battery plates is located in each cell. Rest ups extend upward from the bottom of the case and form receptacles between the rest ups and the side walls of the battery case. The rest ups support the stacks and space the stacks off of the bottom of the battery case.

A pair of clips are attached to the lower edge of each stack, one at each end. One of the clips is a positive clip, electrically connected to the positive battery plates, and the other is a negative clip, electrically connected to the negative battery plates. When the stacks are inserted into the cells, each clip is located within a receptacle. The stacks are oriented to alternate the positive and negative clips along each side wall of the battery case.

A plurality of electrically conductive contacts extend through the partitions at alternate ends of each partition. Each contact extends through a partition from one receptacle to an adjacent receptacle. The contacts hold the clips in the receptacles and provide electrical paths between clips in adjacent receptacles. The positive clip in each cell is thus connected to the negative clip in the next cell.

As in any storage battery, a positive terminal is connected to the positive clip in the first cell and a negative terminal is connected to the negative clip in the last cell. The clips and the contacts thus provide an electrical path from the positive terminal through the battery to the negative terminal.

Finally, the battery case is filled with an electrolyte, such as a solution of sulfuric acid and water. In order to protect the clips and the contacts from the corrosive effects of the electrolyte, the receptacles may be filled with a protective material to cover the clips and contacts. The protective material may be epoxy resin.

The first step in the method of the invention is forming a battery case divided into cells and having rest ups, forming receptacles between the rest ups and the side walls of the case. Holes are then cut through the partitions between cells. Then, electrically conductive contacts are installed in the holes, each contact extending through a partition from one receptacle to the next.

The next step is the formation of the stacks of positive and negative battery plates. A pair of clips are attached to the lower edge of each stack. A positive clip is attached to lugs on the positive plates and a negative clip is attached to lugs on the negative plates.

The stacks are then inserted into the cells, to place each clip in a receptacle, against a contact. The contacts provide an electrical connection between the positive clip in each cell to the negative clip in the next cell. A positive terminal is connected to the positive clip in the first cell and a negative terminal is connected to the negative clip in the last cell.

The battery case is then tilted to one side at an angle of approximately twenty degrees, and epoxy resin is poured into the case until the receptacles on one side are substantially full. Then, the case is tilted to the other side at an angle of approximately twenty degrees and the receptacles on the other side are filled with epoxy resin. The epoxy resin anchor bonds the battery plates to the clips and, the clips to the contacts, to maintain good electrical contact.

Finally, the battery case is filled with electrolyte and sealed shut. The epoxy resin serves as a protective material to protect the clips and contacts from the corrosive effects of the electrolyte.

DESCRIPTION OF THE PREFERRED EMBODIMENT

Figure 1:
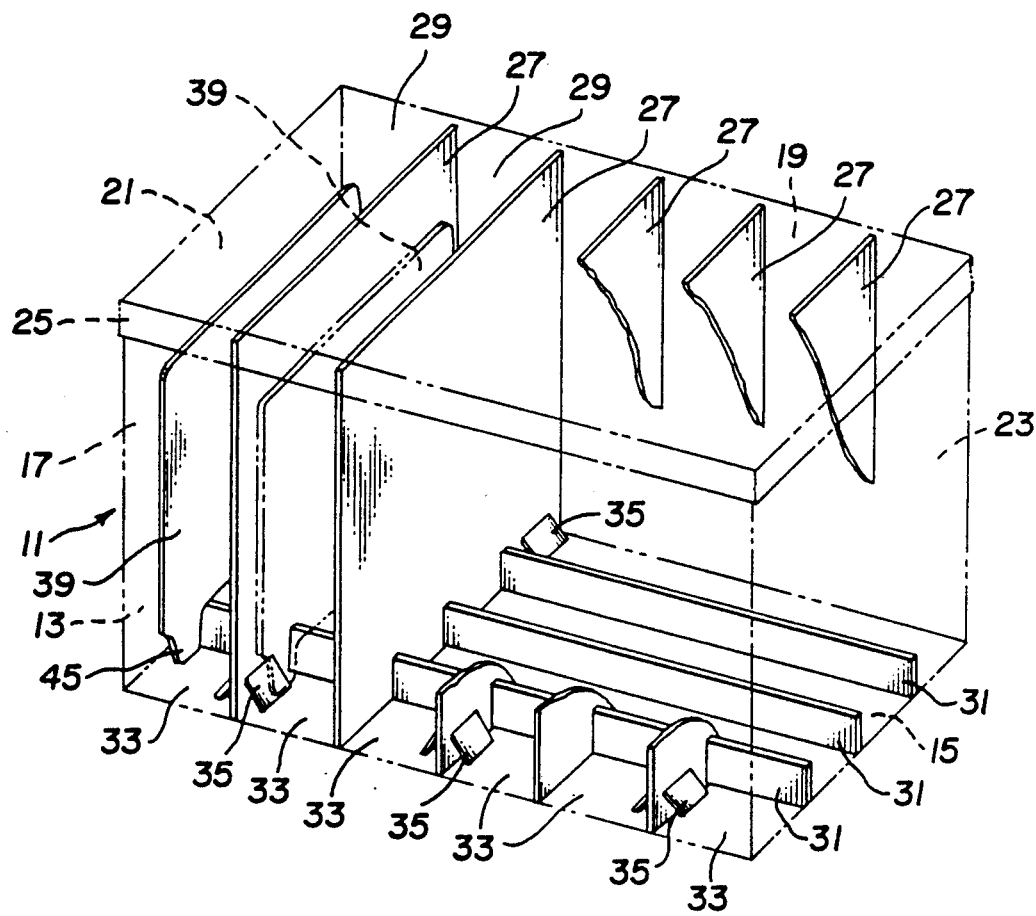
FIG. 1 is a perspective view, partially in section, of a storage battery according to the preferred embodiment of the invention.
Figure 2:
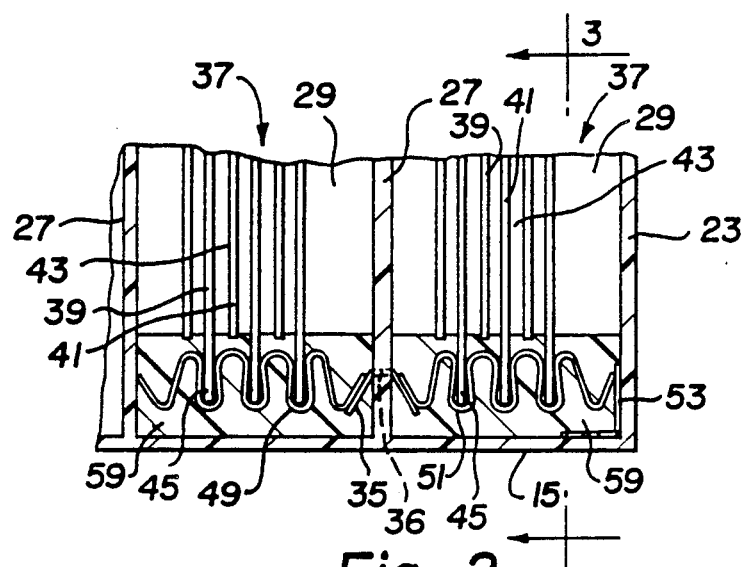
FIG. 2 is a sectional side view of two cells of the storage battery shown in FIGS. 1 and 3 taken along line 2—2 of FIG. 3.
Figure 3:
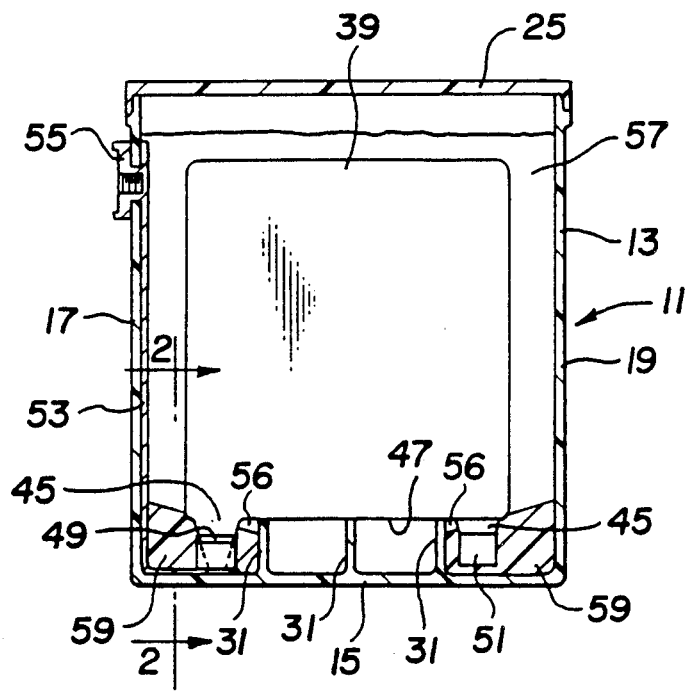
FIG. 3 is a sectional view taken along line 3—3 of FIG. 2.

As shown in FIGS. 1-3, the preferred embodiment of the invention is a lead storage battery 11 having a case 13. The bottom 15, the two side walls 17 and 19, and the two end walls 21 and 23 of the case 13 are molded in one piece to avoid seals below the level of the acid to be added later. The case 13 may be made of rubber, polypropylene, or a similar material. A cover 25 fits over the case 13 to form a sealed enclosure.

A plurality of parallel partitions 27 extend from one side wall 17 to the other side wall 19 of the case 13 to divide &he case 13 into a plurality of fluid tight cells 29. A twelve-volt battery 10 will have five partitions 27 dividing the case 13 into six cells 29.

A plurality of spaced, parallel rest ups 31 are also molded into the case 13. The rest ups 31 extend upward about one inch from the bottom 15 of the case 13 and are perpendicular to the partitions 27. The rest ups 31 form receptacles 33 between the rest ups 31 and the side walls 17 and 19.

A contact 35, made of copper or another electrically conductive material, extends through a hole 36 in each partition 27. Each contact 35 extends from one receptacle 33 through a hole 36 in a partition 27 to an adjacent receptacle 33. The contacts 35 are located at alternate ends of the partitions 27, so each receptacle 33 has one contact 35, except for one receptacle 33 in the first cell 29, next to one end wall 21, and one receptacle 33 in the last cell 29, next to the other end wall 23.

A stack 37 of positive battery plates 39 and negative battery plates 41 is located in each cell 29. In each stack 37 the positive plates 39 and negative plates 41 alternate and are separated by treated wood or glass fiber spacers 43. The positive plates 39 are preferably made of lead dioxide and the negative plates 41 are preferably metallic lead. Each battery plate 39 or 41 is planar and generally rectangular. A lug 45 extends downward from the lower edge 47 of each battery plate 39 or 41. The lugs 45 on the positive plates 39 are aligned at one end, and the lugs 45 on the negative plates 41 are aligned at the other end.

A pair of clips 49 and 51 are attached to the lower edge 47 of each stack 37. A positive clip 49 is attached to the lugs 45 on the positive battery plates 39, and a negative clip 51 is attached to the lugs 45 on the negative plates 41. The clips 49 and 51 are made of copper or another electrically conductive material. Each clip 49 and 51 is approximately three-thousandths of an inch thick and approximately five-eighths inch wide. As seen in FIG. 2, the clips 49 and 51 are serpentine and form a friction fit with the lugs 45 on the battery plates 39 or 41. The positive clip 49 contacts all of the lugs 45 on the positive plates 39 and the negative clip 51 contacts all of the lugs 45 on the negative plates 41 in the stack 37. It may be desirable to laminate each clip 49 and 51 on the lower side with a layer of foam rubber, plastic, or other resilient material.

When the stacks 37 are inserted into the cells 29, the lower edge 47 of each stack 37 lies across the rest ups 31. Each lug 45 and each clip 49 or 51 is thus located within one of the receptacles 33, as seen best in FIG. 3. Each clip 49 or 51 is in a spring loaded clamping configuration between a contact 35 and a partition 27 or between a contact 35 and one of the end walls 21 or 23. As the stack 37 enters the cell 29, the clip 49 or 51 engages the contact 35 to form an electrical connection, similar to the connection formed when a prong on an electric plug enters a socket.

The stacks 37 are inserted into the cells 29 in a manner so that the positive clips 49 and the negative clips 51 alternate along one side wall 17. Thus, the positive clip 49 in each cell 29 is in electrical contact with the negative clip 51 in the next cell 29.

As shown in FIGS. 2 and 3, the negative clip 51 in the last cell 29 is in electrical contact with a strap 53 of conductive material, such as lead. The strap 53 extends from the bottom of the last cell 29 upward to a negative terminal 55, mounted near the top of the side wall 17. The negative terminal 55 could also be a top terminal extending through the cover 25. Another possibility would be placing the negative terminal 55 near the bottom of the side wall 17. Such a placement would reduce the length of the electrical path, thus reducing resistance and increasing voltage, and would allow for shorter battery cables.

The positive clip 49 in the first cell 29 is similarly connected to a strap of conductive material, which is connected to a positive terminal. These components are not shown in the drawings, but are similar to the strap 53 and the negative terminal 55.

The battery case 13 is filled with an electrolyte 57, such as a solution of sulfuric acid. If not protected, the contacts 35 and the clips 49 and 51 would be eaten away by the electrolyte 57. Therefore, before the electrolyte 57 is added, the receptacles 33 are substantially filled with a protective material 59, such as epoxy resin. The epoxy resin 59 insulates the contacts 35 and the clips 49 and 51 from the harmful effects of the electrolyte 57. The epoxy resin 59 also anchor bonds the battery plates 39 and 41 to the clips 49 and 51, and the clips 49 and 51 to the contacts 35 to maintain good electrical contact.

The first step in the method of the invention is forming the battery case 13. The bottom 15 the side walls 17 and 19, and the end walls 21 and 23 are formed in one piece. The partitions 27 and the rest ups 31 may also be formed at the same time as the rest of the case 13.

The horizontal slits or holes 36 are then cut through the partitions 27. The electrically conductive contacts 35 are then installed in the holes 26. Each contact 35 extends through a hole 26 in a partition 27 from one receptacle 33 to the next.

Next, the stacks 37 of positive and negative battery plates 39 and 41 are formed. The positive and negative plates 39 and 41 alternate and are separated by spacers 43. Lugs 45 on the lower edge 47 of the positive plates 39 are aligned at one end of the stack 37 and lugs 45 on the lower edge 47 of the negative plates 41 are aligned at the other end.

A pair of clips 49 and 51 are then attached to the lower edge 47 of each stack 37. A positive clip 49 is attached to the lugs 45 on the positive plates 39 and a negative clip 51 is attached to the lugs 45 on the negative plates 41.

One stack 37 is then inserted into each cell 29 of the case 13. The stacks 37 are alternated so that the positive clip 49 on each stack 37 is adjacent to the negative clip 51 on the next stack 37. The stacks 37 are inserted until the clips 49 and 51 are located in the receptacles 33, in an interference fit between the contacts 35 and the partitions 27. The clips 49 and 51 in the first and last cells 29 fit between a contact 35 and an end wall 21 or 23.

The battery case 13 is then tilted to one side at an angle of approximately twenty degrees, so that the receptacles 33 on the one side wall 17 are below the receptacles 33 on the opposite side wall 19. Epoxy resin 59 is poured into the case 13 until the receptacles 33 along one side wall 17 are substantially full. Then, the case 13 is tilted to the other side at an angle of approximately twenty degrees, so that the receptacles 33 along the one side wall 17 are above the receptacles 33 along the opposite side wall 19. The receptacles 33 on the other side are then filled with epoxy resin 59. The epoxy resin 59 anchor bonds the battery plates 39 and 41 to the clips 49 and 51, and the clips 49 and 51 to the contacts 35, to maintain good electrical contact. The tilting of the case 13 causes the surface of the epoxy resin 59 to be slanted, creating a void 56 in the receptacle 33.

After the epoxy resin 59 has set, the case 13 is filled with an electrolyte solution 57, such as a solution of water and sulfuric acid. The contacts 35 and the clips 49 and 51 are protected from the electrolyte solution by the epoxy resin 59. Finally, the cover 25 is placed on the case 13 and sealed.

Figure 4:
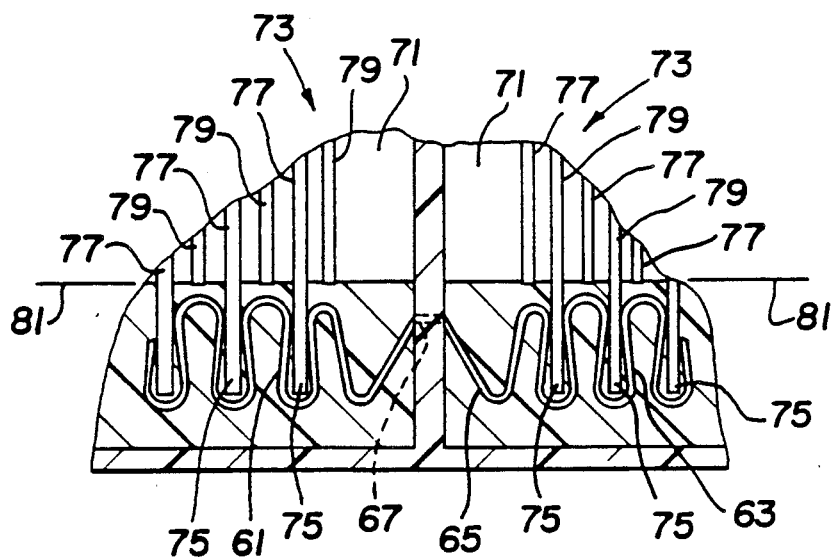
FIG. 4 is a sectional view of two cells of a storage battery according to an alternate embodiment of the invention.

FIG. 4 illustrates an alternate embodiment of the invention. In this embodiment, each positive clip 61 and negative clip 63 is integral with a contact 65 extending through a hole 67 in the partition 69 between two adjacent cells 71. The stacks 73 are inserted into the cells 71 until the lugs 75 on the positive and negative battery plates 77 and 79 are inserted into the positive and negative clips 61 and 63. At that point the lower edge 81 of the stack 73 lies across the rest ups (not shown). The positive clip 61 in one cell 71 is integral with the same contact 65 as the negative clip 63 in the next cell 71. Thus, the positive plates 77 in one stack 73 are in electrical contact with the negative plates 79 in the next stack 73.

The method associated with the alternate embodiment omits the step of attaching the clips 61 and 63 to the stacks 73. After the stacks 73 are formed, the stacks 73 are inserted into the cells 71 until the lugs 75 on the plates 77 and 79 enter the clips 61 and 63.

The storage battery and method of the invention have several advantages over the prior art. A welding step or a casting step is eliminated from the method of manufacturing. Therefore, the method is safer and more economical. The electrical path is shortened, thus reducing resistance and increasing total voltage. The terminals 55 could be moved to the bottom of the side wall 17, allowing for shorter battery cables. Since the connections between cells 29 are at the bottom of the case 13, the chance for sparks in the top of the battery case 13 is removed. Such sparks may ignite gas located above the electrolyte 57. The voids 56 in the receptacles 33 provide space for debris to fall off of the battery plates 39 and 41 to avoid electrical shorting.

The invention has been shown in only two embodiments. It should be apparent to those skilled in the art that the invention is not so limited, but is susceptible to various changes and modifications without departing from the spirit of the invention.

I claim:

1. A storage battery, comprising:
   a battery case having a top, a bottom, a pair of side walls, and a pair of end walls;
   a plurality of parallel partitions within the battery case extending from one side wall to the opposite side wall to divide the battery case into a plurality of fluid tight cells;
   a plurality of spaced, parallel rest ups extending upward from the bottom of the battery case and perpendicular to the partitions to form a plurality of receptacles between the rest ups and the side walls;
   a plurality of stacks of positive and negative battery plates, one stack being located in each cell and having a lower edge resting on the rest ups within the cell;
   a plurality of clips, wherein one clip is attached to each end of the lower edge of each stack, each clip is located in a receptacle, and one of the clips on each stack is in electrical contact with the positive plates in the stack and the other clip on each stack is in electrical contact with the negative plates in the stack;
   a plurality of electrically conductive contacts, each contact extending through a partition at alternate ends of the partitions to provide electrical paths between clips in adjacent pairs of receptacles;
   a pair of terminals extending through the battery case;
   a pair of electrically conductive straps, each strap extending between one of the terminals and one of the clips attached to the stack in one of the cells; and
   an electrolytic solution within the battery case in contact with the battery plates.

2. A storage battery as defined in claim 1, further comprising an protective material to protect the clips and the contacts from the electrolytic solution.

3. A storage battery as defined in claim 2, wherein the protective material substantially fills the receptacles and covers the clips and the contacts.

4. A storage battery as defined in claim 3, wherein the protective material is epoxy resin.

5. A storage battery as defined in claim 4, wherein the clips and the contacts are copper.

6. A storage battery as defined in claim 5, wherein the positive plates are lead dioxide and the negative plates are metallic lead.

7. A storage battery as defined in claim 6, wherein the electrolytic solution is a solution of water and sulfuric acid.

8. A storage battery as defined in claim 1, wherein each contact is integral with the two clips adjacent to the contact.

9. A storage battery as defined in claim 8, further comprising a protective material to protect the clips and the contacts from the electrolytic solution.

10. A storage battery as defined in claim 9, wherein the protective material substantially fills the receptacles and covers the clips and the contacts.

11. A storage battery as defined in claim 10, wherein the protective material is epoxy resin.

12. A storage battery as defined in claim 11, wherein the clips and the contacts are copper.

13. A storage battery as defined in claim 12, wherein the positive plates are lead dioxide and the negative plates are metallic lead.

14. A storage battery as defined in claim 13, wherein the electrolytic solution is a solution of water and sulfuric acid.

15. A method of manufacturing a storage battery, comprising the steps of:

forming a battery case having a top, a bottom, a pair of side walls, a pair of end walls, a plurality of partitions extending from one side wall to the opposite side wall to divide the battery case into a plurality of fluid tight cells, and a plurality of spaced rest ups extending from the bottom of the battery case and arranged transversely to the partitions to form a plurality of receptacles between the rest ups and the side walls;

installing a plurality of electrically conductive contacts, each contact extending through a partition at alternate ends of the partitions from one of the receptacles to an adjacent receptacle;

forming a plurality of stacks of alternating positive and negative battery plates;

attaching a pair of clips to each stack, wherein one clip is attached to each end of the lower edge of each stack, and one of the clips on each stack is a positive clip in electrical contact with the positive plates in the stack and the other clip on each stack is a negative clip in electrical contact with the negative plates in the stack;

inserting one stack into each cell so that each clip is located in a receptacle in electrical contact with a contact, so that the positive clip in each cell is in electrical contact with the negative clip in the adjacent cell; and filling the battery case with an electrolyte solution.

16. A method of manufacturing a storage battery, as defined in claim 15, further comprising the step of covering the clips and contacts with a protective material before filling the case with electrolyte.

17. A method of manufacturing a storage battery, as defined in claim 15, further comprising the step of covering the clips and contacts with epoxy resin before filling the case with electrolyte.

18. A method of manufacturing a storage battery, as defined in claim 15, further comprising the steps of:

tilting the battery case at an angle to place the receptacles along one side wall below the receptacles along the opposite side wall;

pouring a protective material into the case until the receptacles along the one side wall are substantially full;

tilting the battery case at an angle to place the receptacles along the one side wall above the receptacles along the opposite side wall; and pouring a protective material into the case until the receptacles along the opposite side wall are substantially full.

* * * * *